(12) United States Patent
Chan et al.

(10) Patent No.: US 7,108,809 B2
(45) Date of Patent: Sep. 19, 2006

(54) OPTICAL COUPLER REPLICATION ARRANGEMENT AND PROCESS

(75) Inventors: Benson Chan, Vestal, NY (US); Richard R. Hall, Endwell, NY (US); How T. Lin, Vestal, NY (US); Christopher J. Majka, Owego, NY (US); John H. Sherman, Lisle, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 10/262,754

(22) Filed: Oct. 1, 2002

(65) Prior Publication Data

US 2004/0061248 A1 Apr. 1, 2004

(51) Int. Cl.
*B29D 11/00* (2006.01)

(52) U.S. Cl. ............... 264/1.25; 264/2.5; 425/175; 425/406

(58) Field of Classification Search ............... 264/1.1, 264/1.24, 1.25, 25, 1.31, 338, 319, 320; 425/175, 425/808, 90, 406, 810; 427/163.2
See application file for complete search history.

(56) References Cited

U.S. PATENT DOCUMENTS

| | | | |
|---|---|---|---|
| 4,536,058 A | 8/1985 | Shaw | |
| 5,343,544 A | 8/1994 | Boyd et al. | |
| 5,416,868 A | 5/1995 | Kakii et al. | |
| 5,425,848 A * | 6/1995 | Haisma et al. | ............... 216/48 |
| 5,861,113 A | 1/1999 | Choquette et al. | |
| 6,181,854 B1 | 1/2001 | Kojima et al. | |

* cited by examiner

*Primary Examiner*—Mathieu D. Vargot

(57) ABSTRACT

An optical coupler arrangement which is employed for replicating surface features of diverse types of optical devices. Also disclosed is to a novel method of accurately replicating surface features of optical devices; particularly through the utilization of the novel optical coupler arrangement.

18 Claims, 3 Drawing Sheets

OPTICAL COUPLER REPLICATION ARRANGEMENT AND PROCESS

BACKGROUND OF THE INVENTION

1. Field of the Invention

The present invention relates to an optical coupler arrangement which is employed for replicating surface features of diverse types of optical devices. Moreover, the invention is directed to a novel method of accurately replicating surface features of optical devices; particularly through the utilization of the novel optical coupler arrangement.

The manufacture of diverse types of optical devices, such as optical couplers, waveguides and related kinds of devices, necessitates the formation of surface features which are intended to receive or mount optical fibers or the likes at a high degree of precision in their placement. The replication methods which are currently employed in producing surface features of optical devices, for instance, such as grooves for the containment of optical fibers, are subject to limitations inasmuch as during replication thereof, frequently encountered are distortions and manufacturing inaccuracies which are potentially caused by the types of manufacturing methods and materials which are presently employed in this technology. For instance, in applying various types of replication methods which are intended adapted to form surface features, such as optic fiber-receiving grooves in substrates, the desired processing precision during replication is adversely affected or even lost due to differences in the materials, thermal variations and surface flaws present in the replication components or masters.

Conventional optical connectors and couplers are equipped with fibers which are retained in a captive position within channels or grooves defined between the upper and lower halves of mating substrates. Generally, one of the substrates is provided with a surface which is traversed by parallel grooves, each such groove normally possessing a V-shaped cross-section. These grooves are ordinarily formed by either photolithography and/or chemical etching methods, resultingly necessitating the employment of sophisticated production equipment and tightly controlled chemical processes. Moreover, in implementing successive replications, the different types of materials and wear over time and use of the processing components lead to unacceptably high manufacturing tolerances, adversely affecting the efficacy of any optical device formed by means of such methods. Although the use of masters in replicating patterns or grooving substrates for the positioning of optical fibers or the like is widely known, the current technology in employing the photolithographic and chemical etching processes, through requiring complex arrangements and methods render the manufacture of accurate and widely diverse optical devices expensive and cumbersome. In contrast with the foregoing, the present invention improves upon the currently known replicating arrangements and manufacturing methods for producing optical devices by rendering them simpler and also being less expensive while providing a superior process and higher degree of accuracy in forming grooved or contoured surfaces on the substrate. In that connection, pursuant to the invention there is employed a pressing process adapted to essentially form a master part and a submaster which acts as a mold for the replication of couplers for optical devices. This particular type of arrangement and method of producing replicated couplers for optical devices is not at all disclosed nor suggested in the current state-of-the technology.

2. Discussion of the Prior Art

Kojima et al. U.S. Pat. No. 6,181,854 B1 describes an optical module which is adapted to be manufactured through the intermediary of transfer molding. The structure produced in forming the optical module is through the use of a molded resin and is limited to a particular single application and which cannot be readily employed to the replication of optical devices pursuant to the invention. This is because as Kojima et al. fails to provide for a pressing process to form optical fibers receiving grooving or features on a substrate in a precise manner.

Choquette, et al. U.S. Pat. No. 5,861,113 discloses the fabrication of embossed diffractive optics with a reusable release agent, such as a fluorinated silane and then applying coatings of an epoxy resin. The method described in this publication produces a plastic diffractive pattern through the pressing of a curable plastic against a master. The publication is only adapted to provide for diffractive optics and does not disclose any applicability to a wide range of optical devices where the replication method pursuant to the invention has found broad potential utilizations.

Foley et al. U.S. Pat. No. 5,500,914 discloses an optical interconnect unit and method of manufacture thereof adapted to produce an optical connector through molding. The replication method pursuant to the invention and the arrangement employs pressing procedure forming a so-called mold of a sub-master is not at all disclosed nor suggested in the patent, and consequently the present invention pertains to a broad concept of producing optical devices unlike that of the Foley et al. patent.

Boyd et al. U.S. Pat. No. 5,343,544 discloses the manufacture of optical couplers which contains aligned wave channels. Although some similarities with the inventive concept may be ascertained from this publication, the latter is limited to optical couplers and cannot be employed to the production of diverse types of devices. Moreover, the publication utilizes the use of a master wherein the mold loses precision due to material differences, thermal variations and surface flaws which may be evident in the substrates. To the contrary, unlike this patent, the inventive master is utilized in the manufacture of a final component, whereas the publication employs the master so as to produce a mold which can lose the strict tolerances during subsequent replication due to mold wear. Moreover, the invention employs a pressing process providing for precision scribing of the features into the surface of the substrate so as to enable accurate positioning of optical fibers or coupling components, whereas the publication employs less precise photolithography and silicon etching methods. Thus, the publication is limited to an aspect in affording a limited method of manufacture for fiber optic couplers and waveguide channels, unlike the present invention which enables the replication process to be employed for the most diverse types of optical devices.

Kakii et al. U.S. Pat. No. 5,416,868 describes optical connectors in which a resin molding portion is employed, including opposite open portions at top and bottom surfaces adapted to receive connector pins and optical components. The resin molding process is not adapted to provide the unique method of replication and arrangement as described herein wherein a wide array of diverse types of optical devices can be produced through a unique submaster.

Finally Shaw et al. U.S. Pat. No. 4,536,058 is directed to a method of manufacturing a fiber optic directional coupler of a completely different structure and aspect, and produces various optical fibers for tying various devices together. This has nothing in common with the novel replication method and arrangement for producing optical devices in a precise manner analogous to that disclosed by the present invention.

SUMMARY OF THE INVENTION

Accordingly, in order to obviate or ameliorate the limitations encountered in the prior art, particularly pertaining to concepts pertaining to arrangements and methods for replicating features on optical devices, the present invention is directed to the provision of an apparatus and a process which involves copying a pattern of intricate features, such as grooves, embosses or the like from a precision master through the precise position of a master employed in a pressing step. Resultingly, the respectively employed optical base structure and the optical components have patterns of the features formed on mating surfaces, with the assemblies adapted to be passively aligned upon being assembled.

Basically, the present invention provides for an improved and unique arrangement and replication method for optical devices, wherein the master part is constructed in that a submaster is produced which acts as a so called "mold" for the replication of couplers or other optical devices of the most diverse types, such as waveguides, filters, mirrors, beam splitters, prisms, lenses and the like. In connection with the foregoing, a suitable epoxy layer and a parting agent may be mounted on or imparted to the top surface of the submaster, wherein the epoxy layer of the coupler is formed against the parting agent on top of the groove surface of the submaster, thereby producing the pattern which is required to locate the optical fibers. Although epoxy is referred to herein, the master material may include any thermally ultrastable material, which may be referred to as "ULE" (ultralow expansion) material for the master or the part. This is basically a non-crystalline glass material produced by Corning Corporation which enables forming a broader field of groove dimensions and shapes, unlike the current technology wherein the grooves are limited to a V-shape of generally 54.7° which silicon crystals possess subsequent to etching. Inasmuch as an amorphous material may be employed by the present invention, it is possible to provide a considerable variety of cross-sectional groove shapes allowing for a broader range of applications rather than merely typical couplers, inasmuch as the grooves can possess curved, sides, non-symmetrical cross-sections, vertical faces and so forth, in contrast with the state-of-the-technology.

Rather than employing photolithography and/or chemical etching to provide the features on the surface on the master which is employed for replication, the various kinds of features can be inscribed and replicated due to the use of non-crystalline materials whereby smooth bends and/or curves can be imparted thereto. This is particularly directly beneficial to waveguide applications for circuit boards and card designs.

Accordingly, it is an object of the present invention to provide a novel arrangement and method for the accurate replication of features on optical devices.

Another object of the present invention resides in the provision of an arrangement and method for the replication of features, such as grooves and the like, in the surfaces of diverse optical devices so as to be able to accurately position optical fibers therein.

Still another object of the present invention resides in the provision of an arrangement and method for the replication of features in an accurate manner in the surfaces of a wide range of optical devices, such as couplers, waveguides, beam splitters, mirrors, lenses, filters, prisms, and the like.

Still another object of the present invention resides in the provision of an arrangement and method which produces the desired features in effecting an accurate replication on the surfaces of optical devices through the imposition of pressure employing a master as a so-called mold structure.

BRIEF DESCRIPTION OF THE ACCOMPANYING DRAWINGS

Reference may now be made to the following detailed description of preferred embodiments of the invention, taken in conjunction with the accompanying drawings; in which.

DETAILED DESCRIPTION OF THE PREFERRED EMBODIMENTS

Figure 1:
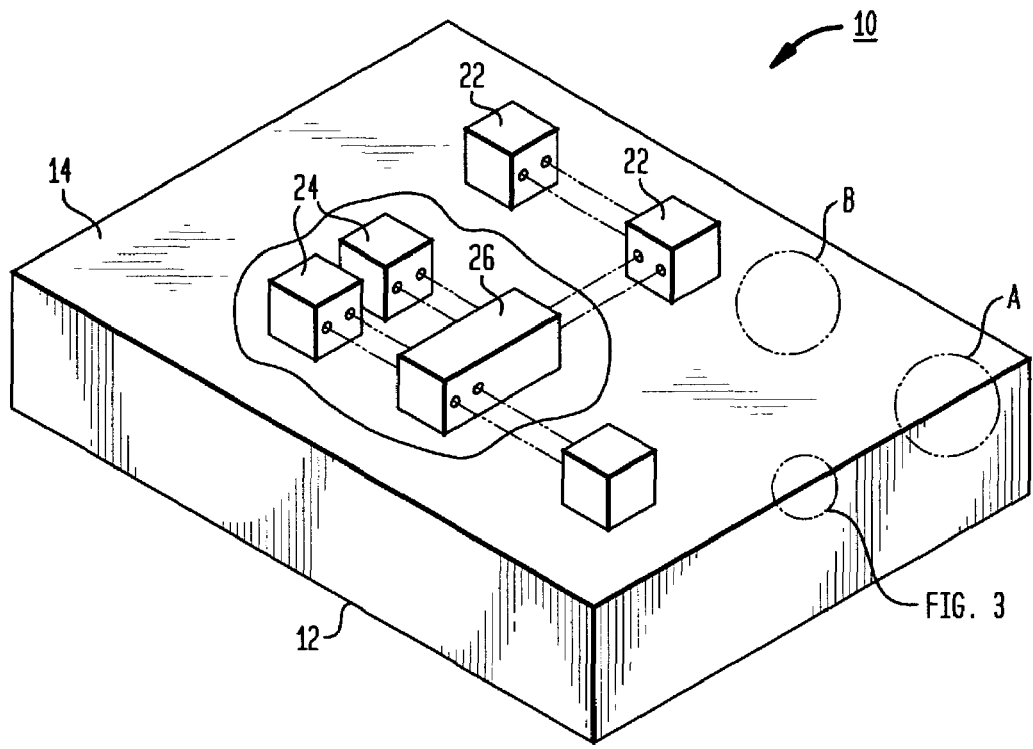
FIG. 1 illustrates, generally diagrammatically, a perspective view of an optical device formed by the replicating method pursuant to the invention.
Figure 3:
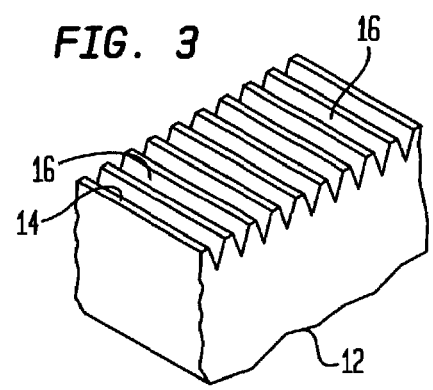
FIG. 3 illustrates on an enlarged scale, a fragmentary portion of the substrate showing the optical features formed therein, in the encircled area A in FIG. 1.
Figure 2:
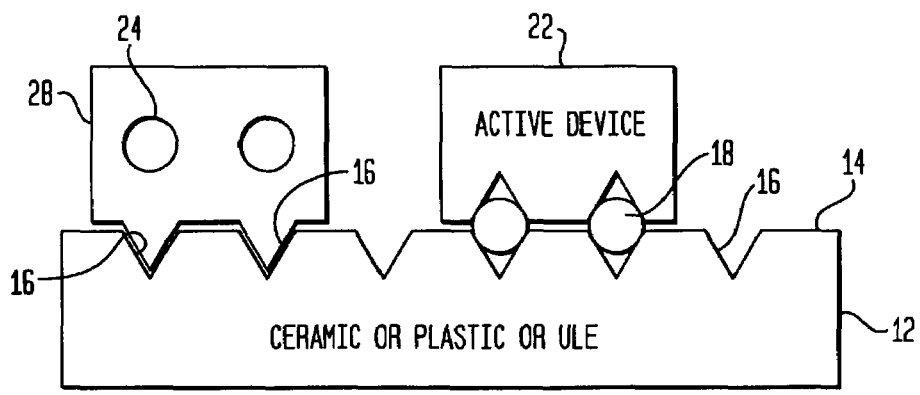
FIG. 2 illustrates, on an enlarged scale, general diagrammatically an end view of the optical device of FIG. 1.

Referring now specifically to FIG. 1, there is illustrated an optical coupler device 10, comprising a substrate 12 which includes a surface 14 having grooves 16 formed therein, as shown in the enlarged detail of FIG. 3, for the receipt of optical fibers 18 and pin connections 20, the precise structure of which is known in the technology. In essence, as shown in FIGS. 1 and 2 of the drawings; mounted on the substrate 12 are optical devices 22, including active operating devices 24 and beam splitters 26 forming so-called "smart islands". As shown in particular in FIG. 2 of the drawings, received in the grooves 16 which are formed in the upper surface 14 of the substrate 12, the latter of which may be constituted of a ceramic or plastic material or an ultalow expansion non-crystalline glass material (i.e. such as ULE), are the optical fibers 18 which communicate with the active operating devices 84, and the optical devices 22 and chip locations 28.

Figure 4:
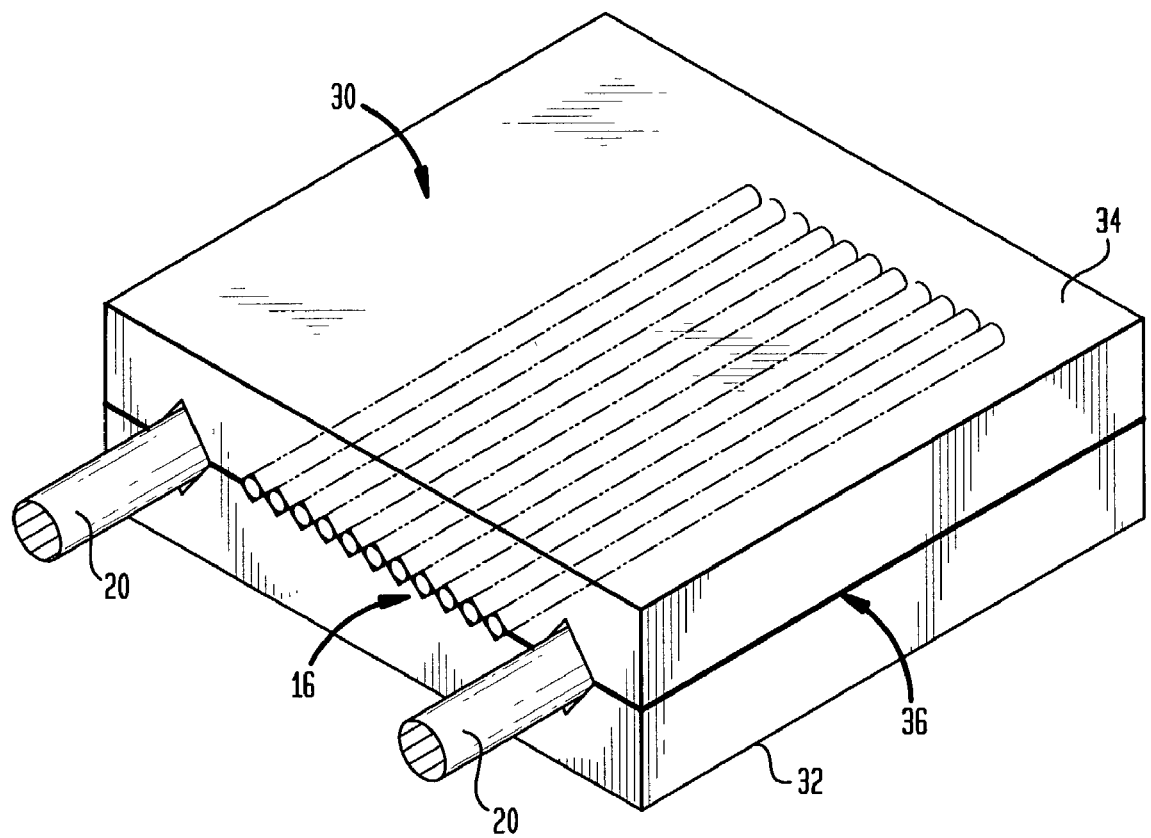
FIG. 4 illustrates a perspective view of an optical device employing the structure pursuant to the invention.
Figure 5:
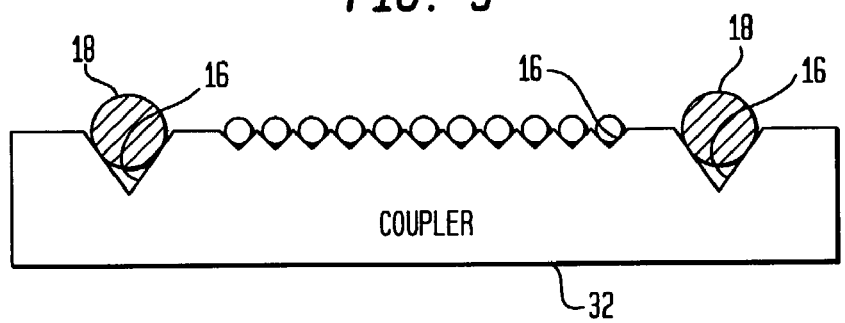
FIG. 5 illustrates, diagrammatically, a view of a coupler illustrating the features produced pursuant to FIG. 4 of the invention.

As illustrated specifically in FIG. 4 of the drawings, the optical device may be a silicon coupler 30, wherein as shown in FIG. 5, a lower substrate 32 thereof comprises a coupler having grooves 16 or suitable features molded therein for receiving optical fibers 18, and also pins 20 for forming the necessary electrical or transmissive connections. An upper suitable portion 34 may then be fastened by means of an adhesive 36 to the coupler substrate 32, as shown in FIG. 5 of the drawings.

Figure 6:
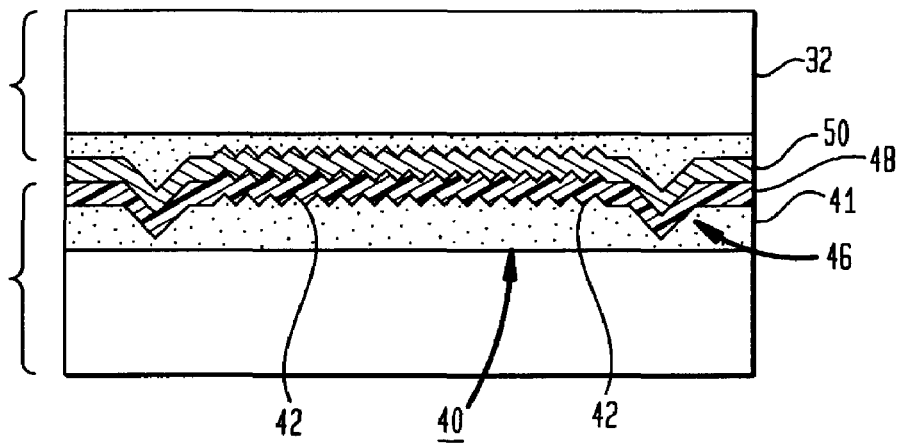
FIG. 6 illustrates an arrangement for an optical coupler replication implemented pursuant to the present invention.

In order to be able to replicate the optical devices 24, and in essence, the coupler substrate 32 and the features therein, as shown in FIG. 6 of the drawings a submaster substrate 40 may be provided, and which already has a submaster epoxy layer 41 with grooves 42 formed therein. The epoxy layer 41 is applied in a liquid state, and is then hardened or cured at either room temperature or alternatively by heating to accelerate the curing. The submaster substrate 40 may be constituted of either a suitable thermally ultrastable material, such as a ultralow expansion material (ULE) as produced for example by Corning Corporation. This material is a glass material of a non-crystal like nature which permits the formation or molding therein of a broad spectrum of groove dimensions and shapes. The cured epoxy grooves 42 may have curved sides, non-symmetrical cross-sections, vertical faces and so forth which facilitate their applications to the producing of various types of optical devices, which are not only limited to optical couplers, as is well known in the prior art, but rather expanded also to waveguides, filters, lenses, mirrors, prisms, beam splitters and similar optical devices of diverse kinds established in the technology.

Figure 7:
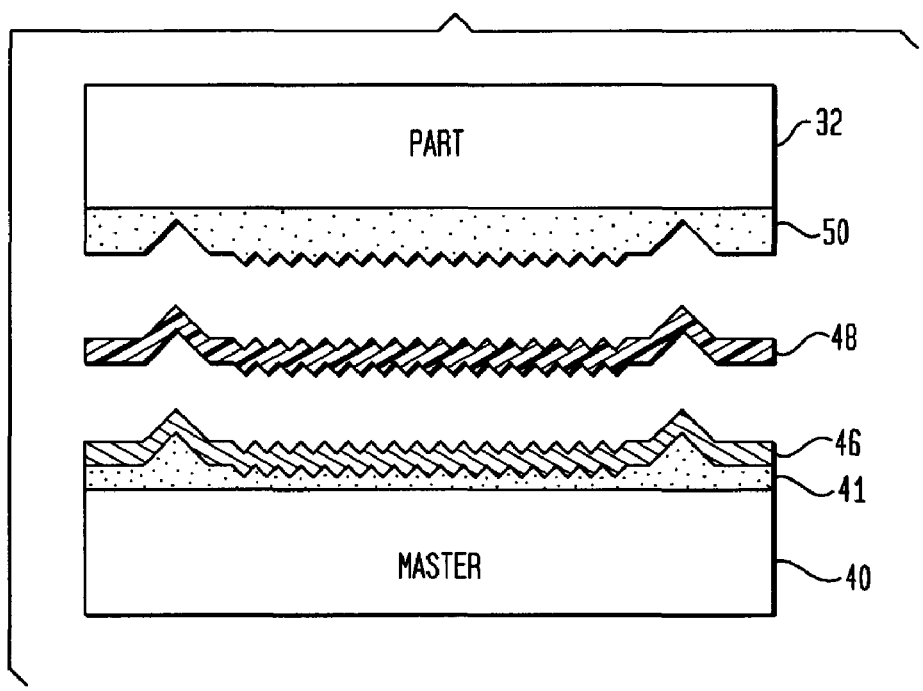
FIG. 7 illustrates on a smaller scale generally diagrammatically, an exploded view of the structure of FIG. 6.

The submaster substrate 40 has the desired features 42 such as grooves and the like provided therein through the intermediary of precision scribing in a positive manner, unlike the prior art which ordinarily employs either photolithographic and/or chemical etching processes. As shown in FIGS. 6 and 7, a metal coating 46 may be applied to the epoxy layer 41 on the submaster substrate 40, such coating being possibly constituted of any suitable metals; for instance, preferably such as but not limited to aluminum, copper, or the like, and thereafter applied thereon is a parting agent 48, which may comprise a silane or resin material. This parting agent has no optical effects and is merely provided to aid in the separation between components 32 and 40.

The coupler substrate 32 or the substrate for the optical device which is to be produced, has a layer of a moldable material 50 provided thereon, such as an epoxy or the like, then through implementing a compressive action between the coupler 30 or optical device substrate 32 or the submaster substrate 40, as shown in FIG. 6, the epoxy material 50 is imparted the desired feature configuration, in effect the grooving or other shapes, i.e. curvatures, which may be desired for enabling the positioning therein of the optical fibers 18 or the like.

Thereafter, the coupler 30 or optical device substrate 32 is separated from the submaster substrate 40, with the parting agent 48, such as the silane enabling separation between the parts while permitting the moldable material 50, in effect the epoxy or the like to remain on the planar surface of the substrate 32 which forms the optical coupler 30 or the optical device.

Thereafter, the submaster substrate 40 may have a further layer of parting agent 48 applied thereto, and another coupler 30 or optical device substrate 32 having a epoxy layer 50 thereon or other suitable moldable material positioned and pressed and cured thereagainst so as to replicate the preceding method and to resultingly form additional optical device substrates having the precisely conformed features provided therein in a rapid and economical manner.

The foregoing inventive method and arrangement avoids costly photolithographic or chemical etching processes, and also reduces the potential wear and cost of the components. In the event that during continued and repeated use the submaster substrate 40 is worn down; in effect there is encountered a deterioration due to wear of the features and any damage, it is an inexpensive and simple matter to replace this structure with a further submaster substrate 40 having the metal layer or coating 46 provided thereon. This avoids the need to provide further submasters necessitated by means of photolithographic processes or chemical etching.

Figure 8:
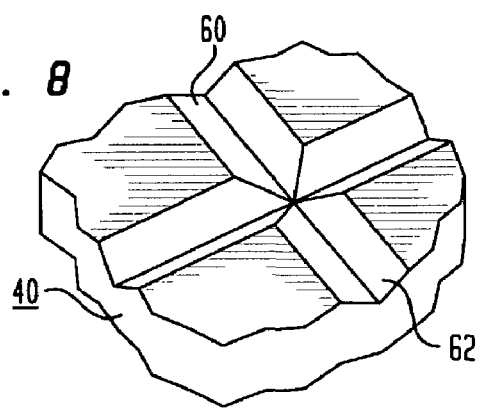
FIG. 8 illustrates, on an enlarged scale, a perspective fragmentary view of the encircled portion B in FIG. 1, showing an alternative configuration of the features produced by the replication method pursuant to the invention.

Moreover, in accordance with the present invention, inasmuch as the features, such as grooves 16, are inscribed rather than formed through photolithographic and/or chemical etching, it becomes a simple expedient to impart different configurations to the feature, such as cross-wise grooves 60 and ridges 62, or embossings, as shown in FIG. 8 of the drawings. Furthermore, it is also possible to produce (not shown) curvilinear shapes or grooves having differently sloped angles and flank or side surfaces, such as a vertical side and an angled side, flat bottomed grooves, and/or any combinations thereof.

From the foregoing, it becomes readily apparent that the invention provides further improvements upon the replication apparatus and method provided for in the prior art, particularly with regard to that shown in the Boyd et al. U.S. Pat. No. 5,343,544, regarding which the present invention considerably improves and increases the versatility in the production of optical devices, which on the basis of the inventive arrangement and method are not limited to optical couplers but are expanded to extend over an entire spectrum of the optical technology.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method of producing an optical fiber coupler, said method comprising the steps of:
   applying a layer of epoxy to a first substrate and curing said epoxy;
   scribing said epoxy layer after said curing step to form cross-wise grooves or cross-wise ridges;
   applying a metallic coating over the scribed epoxy layer, said metallic coating assuming a shape of said cross-wise grooves or cross-wise ridges;
   applying a layer of moldable material to a second substrate;
   positioning said first and second substrates such that said metallic coating faces said layer of moldable material, and pressing said first substrate and said second substrate against each other such that said cross-wise grooves or cross-wise ridges of said epoxy layer and said metallic coating are embossed into said moldable layer; and
   subsequently separating said first substrate from said second substrate, wherein the moldable layer forms said optical fiber coupler and the cross-wise grooves or cross-wise ridges locate optical fibers.

2. A method as set forth in claim 1 further comprising the step of interposing a layer of parting agent between said metallic coating and said layer of moldable material before the pressing step to facilitate the step of separating said first substrate from said second substrate.

3. A method as set forth in claim 2 wherein the interposing step is performed by applying said layer of parting agent to an exposed surface of said metallic coating.

4. A method as set forth in claim 3 further comprising the subsequent steps of:
   applying another layer of a parting agent to the exposed surface of said metallic coating;
   applying another layer of moldable material to a third substrate; and positioning said first and third substrates such that said metallic coating faces said other layer of moldable material with said parting agent interposed between said metallic coating and said other layer of moldable material, and pressing said first substrate and said third substrate against each other such that said cross-wise grooves or cross-wise ridges of said epoxy layer and said metallic coating are embossed into said other layer of moldable material.

5. A method as claimed in claim 1, wherein said metallic coating is selected from the group consisting of copper, aluminum and metal alloys.

6. A method as claimed in claim 1, wherein said parting agent is selected from the group consisting of silane and resins.

7. A method as set forth in claim 1 wherein said first substrate comprises a non-crystalline glass material.

8. A method as set forth in claim 7 wherein said non-crystalline glass material has an ultralow expansion property.

9. A method as claimed in claim 1, wherein the scribing step forms cross-wise ridges in said epoxy layer, and further comprising the step of placing optical fibers within cross-wise grooves embossed by said cross-wise ridges of said epoxy layer and said metallic coating in said layer of moldable material.

10. A method as set forth in claim 1 wherein said moldable material is epoxy, and further comprising the step of curing said epoxy moldable material during the pressing step.

11. A master for producing an optical fiber coupler, said master comprising:
a first, flat substrate;
a layer of cured epoxy on said first substrate, said cured epoxy layer having an embossing pattern of cross-wise grooves or cross-wise ridges on a face of said cured epoxy layer opposite said first substrate;
a metallic coating on said face of said cured epoxy layer, said metallic coating having a shape of said cross-wise grooves or cross-wise ridges; and
a layer of parting agent on a surface of said metallic coating opposite said cured epoxy layer, said layer of parting agent adapted to interface to a layer of moldable material of a second substrate into which said pattern of cross-wise grooves or cross-wise ridges embosses, and after embossing and curing of said moldable layer, said layer of parting agent facilitates separation between said metallic coating and cured moldable material; and wherein said embossing pattern of cross-wise grooves or cross-wise ridges are formed by scribing into said cured epoxy layer and wherein the moldable layer forms said optical fiber coupler and the cross-wise grooves or cross-wise ridges locate optical fibers.

12. A master as claimed in claim 11, wherein said metallic coating is selected from the group consisting of copper, aluminum and metal alloys.

13. A master as claimed in claim 11, wherein said parting agent is selected from the group consisting of silane and resins.

14. A master as set forth in claim 11 wherein said first substrate comprises a non-crystalline glass material.

15. A master as set forth in claim 14 wherein said non-crystalline glass material has an ultralow expansion property.

16. A master as claimed in claim 11, wherein there are cross-wise ridges in said cured epoxy layer.

17. A master as set forth in claim 11 wherein said moldable material is epoxy.

18. An assembly for producing an optical fiber coupler, said assembly comprising:
a first, flat substrate;
a layer of cured epoxy on said first substrate, said cured epoxy layer having an embossing pattern of cross-wise grooves or cross-wise ridges on a face of said cured epoxy layer opposite said first substrate;
a metallic coating on said face of said cured epoxy layer, said metallic coaxing having a shape of said cross-wise grooves or cross-wise ridges;
a layer of parting agent on a surface of said metallic coating opposite said cured epoxy layer;
a second substrate;
a layer of curable, moldable material on said second substrate, said layer of curable, moldable material being engaged by pressure against said metallic coating on said face of said cured epoxy layer such that said pattern of cross-wise grooves or cross-wise ridges is embossed into said curable, moldable material, said curable moldable material being cured to preserve said pattern of cross-wise grooves or cross-wise ridges which are embossed into said curable, moldable material; and wherein said embossing pattern of cross-wise grooves or cross-wise ridges in said cured epoxy layer was formed by scribing into said cured epoxy layer and wherein the moldable layer forms said optical fiber coupler and the cross-wise grooves or cross-wise ridges locate optical fibers.

* * * * *